(12) United States Patent
Claas et al.

(10) Patent No.: US 7,975,793 B1
(45) Date of Patent: Jul. 12, 2011

(54) TILTING FOOT POD FOR THE OPERATOR CAB OF A SKID STEER VEHICLE

(75) Inventors: Robert Claas, Saukville, WI (US); Marvin Joray, Wentworth, SD (US); Aaron Goddard, Germantown, WI (US); Curtiss M. Lee, Arlington, SD (US); Anthony Saiia, Mequon, WI (US)

(73) Assignee: Gehl Company, West Bend, WI (US)

( * ) Notice: Subject to any disclaimer, the term of this patent is extended or adjusted under 35 U.S.C. 154(b) by 277 days.

(21) Appl. No.: 12/348,147

(22) Filed: Jan. 2, 2009

(51) Int. Cl.
*B62D 33/03* (2006.01)
*B60N 3/06* (2006.01)

(52) U.S. Cl. ............... 180/89.13; 180/89.14; 296/75; 296/190.05

(58) Field of Classification Search .......... 180/89.1, 180/89.12, 89.13, 89.14, 89.17, 89.18, 90.6; 280/163, 166; 296/75, 190.05, 190.06; 414/680, 414/685, 686
See application file for complete search history.

(56) References Cited

U.S. PATENT DOCUMENTS

| | | | |
|---|---|---|---|
| 4,405,280 A * | 9/1983 | Cochran et al. | 414/685 |
| 5,518,358 A | 5/1996 | Aschroft et al. | |
| 5,520,500 A | 5/1996 | McIlwain et al. | |
| 6,357,820 B1 | 3/2002 | Nagatsuka et al. | |
| 6,543,563 B1 | 4/2003 | Muraro | |
| 6,910,731 B2 | 6/2005 | Albright et al. | |
| 7,537,074 B2 * | 5/2009 | Ishii et al. | 180/89.12 |
| 7,588,287 B2 * | 9/2009 | Case et al. | 296/190.08 |
| 7,744,148 B2 * | 6/2010 | Jones et al. | 296/190.05 |
| 7,806,466 B2 * | 10/2010 | Shurts et al. | 296/190.06 |
| 2007/0145779 A1 | 6/2007 | Jones et al. | |
| 2007/0145780 A1 * | 6/2007 | Tecklenburg et al. | 296/190.08 |

* cited by examiner

*Primary Examiner* — Ruth Ilan
*Assistant Examiner* — Joseph Rocca
(74) *Attorney, Agent, or Firm* — Boyle Fredrickson, S.C.

(57) ABSTRACT

A foot pod for use with the operator cab of a construction vehicle is designed to pivot separately from the operator cab. The operator cab may be pivoted toward the rear of the construction vehicle and the foot pod may be pivoted toward the front of the construction vehicle. Pivoting the foot pod toward the front of the vehicle permits ground access to the foot pod and any controls carried thereby. Separately pivoting the foot pod forward is particularly advantageous for cleaning the foot pod or servicing any controls carried by the foot pod. Isolation mounts may be used to dampen vibrations from the chassis to the foot pod and the operator cab.

18 Claims, 8 Drawing Sheets

TILTING FOOT POD FOR THE OPERATOR CAB OF A SKID STEER VEHICLE

BACKGROUND AND SUMMARY OF THE INVENTION

The present invention is directed generally to a construction vehicle such as a skid steer vehicle or a compact track-type vehicle or loader and, more particularly, to a tilting foot pod for the operator cab of a such a vehicle which facilitates cleaning and servicing of the foot pod.

Early construction vehicles, such as a skid loaders, were designed with an exposed operator cab that enabled the operator to easily enter and exit the operator cab as well as communicate with ground workers during loading, moving, excavating or other operations. Increasingly, skid steer vehicles with enclosed operator cabs were developed. The enclosed operator cabs provided a number of advantages over conventional open operator cabs, including climate control, noise control and safety.

Enclosed operator cabs are generally equipped with a front door to permit the ingress to and the egress from the operator cab. While convenient for entering or exiting the operator cab, such a configuration does not permit much room to clean the operator cab or perform maintenance on the various controls that are located in the operator cab. A skid steer vehicle is commonly used in highly dirty or dusty environments so it is not uncommon for the operator cab to eventually become soiled with dirt, dust and grime. As a result, new operator cab designs have been proposed to make accessing the interior of operator cab for cleaning or maintenance purposes less cumbersome.

For example, U.S. Publ. No. 2007/0145779 describes a machine cab having a cab frame and toe guard extending forward of the cab frame. The machine cab is designed to pivot about a rearward axis to permit access to various components that are generally inaccessible when the machine cab is in the working position. The base of the cab frame remains stationary as the cab frame is titled rearward. Thus, to clean the base, or foot area, or perform any maintenance on any controls that are mounted to or around the foot area, it is necessary to climb into the cab to access the foot are, which may be difficult. Moreover, the range of motion of the cab frame may limit the amount of clearance available.

Others, such as Albright et al. in U.S. Pat. No. 6,910,731 and Muraro in U.S. Pat. No. 6,543,563, have also described pivoting operator cabs for skid steer vehicles. These patents describe operator cabs having recessed areas specifically designed to receive the feet of an operator when the operator is seated in the operator cab. The recessed areas are fastened to the operator cabs so as to pivot therewith. These pivoting operator cabs therefore provide access to components of the skid steer vehicle that are generally inaccessible when the operator cab is in a working position, but access to the interior of the operator cab, including the foot area, is not improved when the operator cab is tilted.

The present invention is directed to an operator cab for a skid steer vehicle having a separately tilting foot pod. The foot pod may be titled or pivoted forward thereby separately allowing ground access to the foot pod for cleaning or maintenance purposes. In operation, an upper frame portion of the operator cab is pivoted rearward to expose the foot pod. The foot pod may then be pivoted toward the front of the skid steer vehicle. In one representative embodiment, joystick controls may be supported by the foot pod and thus pivot with the foot pod. This allows ground access to the joystick controls for maintenance and other purposes when the upper portion of the operator cab has been pivoted rearward and the foot pod is in its forward titled position. Isolation mounts are preferably used to dampen any vibratory forces that may otherwise be transferred from the vehicle chassis to the foot pod. The operator cab frame may carry seals that seal the interior of the operator cab from dust and dirt. In one representative embodiment, the foot pod is made of fiberglass.

Therefore, it is an object of the present invention to provide a separately pivotable foot pod for an operator cab of a construction vehicle.

It is yet another object of the invention to improve access to the interior of an operator cab for cleaning and maintenance purposes.

It is a further object of the invention to provide a foot pod for an operator cab that is isolated from vibrations from the chassis of the construction vehicle.

It is another object of the invention to provide ground access to operator controls mounted to the foot pod of an operator cab of a construction vehicle.

Yet another object of the invention is to provide a construction vehicle that includes a pivotable operator cab and foot pod that are constructed and arranged to enable the interior of the cab to be sealed for climate control and pressurization.

Therefore, in accordance with one aspect of the present invention, a foot pod for use with an operator cab of a construction vehicle includes a frame adapted to be positioned on the chassis of the operator cab. A cavity is defined in the frame for receiving the feet of an operator when the operator is positioned within the operator cab. A mounting assembly couples the frame to the chassis in a manner that allows the frame to be titled upward and toward the front of the chassis.

In accordance with another aspect of the present invention, an operator cab assembly for a construction vehicle includes an operator cab frame pivotably coupled to a rearward portion of the chassis. A foot pod is pivotably coupled to a forward portion of the chassis so that the foot pod may be pivoted about the forward portion of the chassis when the operator cab frame has been pivoted rearwardly about the rearward portion of the chassis.

According to another aspect, the present invention includes a construction vehicle having a chassis, and an operator cab mounted to the chassis and tiltable in a first direction away from the chassis. The skid steer vehicle is further equipped with a foot pod mounted to the chassis and tiltable in a second direction, opposite the first direction, away from the chassis. The foot pod is configured to rest beneath the operator cab when the operator cab and the foot pod are in non-tilted working positions.

In accordance with yet a further aspect of the invention, a method of cleaning the foot pod of an operator cab of a construction vehicle is proposed. The method includes rearwardly tilting the operator cab relative to a chassis of the vehicle and then forwardly tilting the foot pod relative to the chassis. The foot pod has a cavity into which the feet of an operator may extend during normal operation of the vehicle. The method involves removing any unwanted material from the cavity when the foot pod is in a forward tilted position.

Various other features and advantages of the present invention will be made apparent from the following detailed description and the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
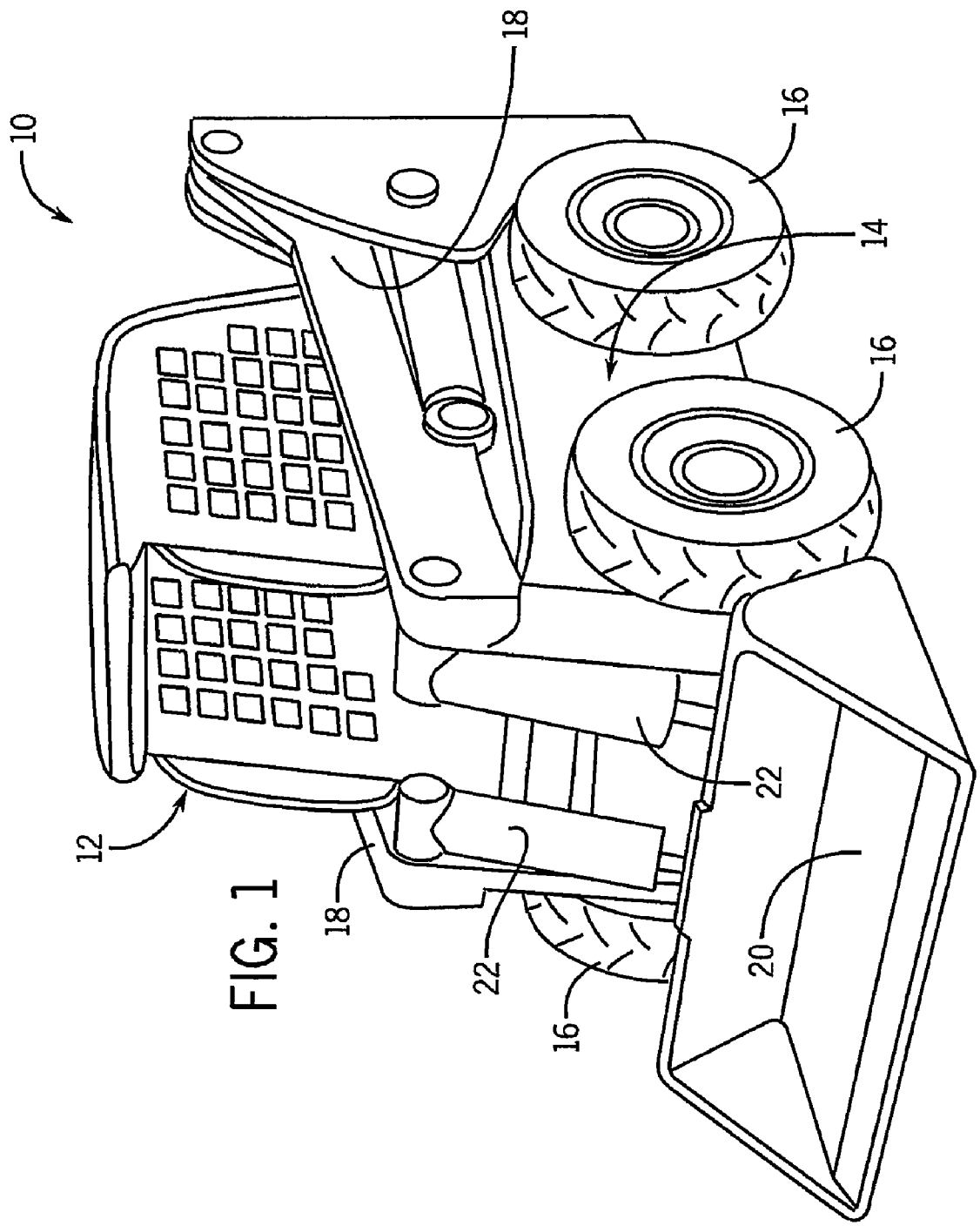
FIG. 1 is a pictorial view of a construction vehicle, in the form of a skid steer loader, incorporating a separately tiltable operator cab and a foot pod in accordance with the present invention.

The present invention is directed to a foot well or pod for a construction vehicle such as a skid steer loader 10, such as shown in FIG. 1. The skid steer loader 10 has an operator cab 12 that is secured in a known manner to a chassis 14. The chassis 14 supports two axles (not numbered) that each support two wheel and tire assemblies 16, as is known. The chassis 14 also supports a pair of lift arms 18 or booms that may lift bucket 20, or other attachment, such as a fork lift. Tilt arms 22 are coupled to the lift arms 18 and operate to tilt the bucket 20. The lift arms 18 and the tilt arms 22, as well operation of the loader 10 in general, are controlled by controls (not shown), such as joysticks, levers, push buttons, etc., contained within the operator cab 12.

Figure 2:
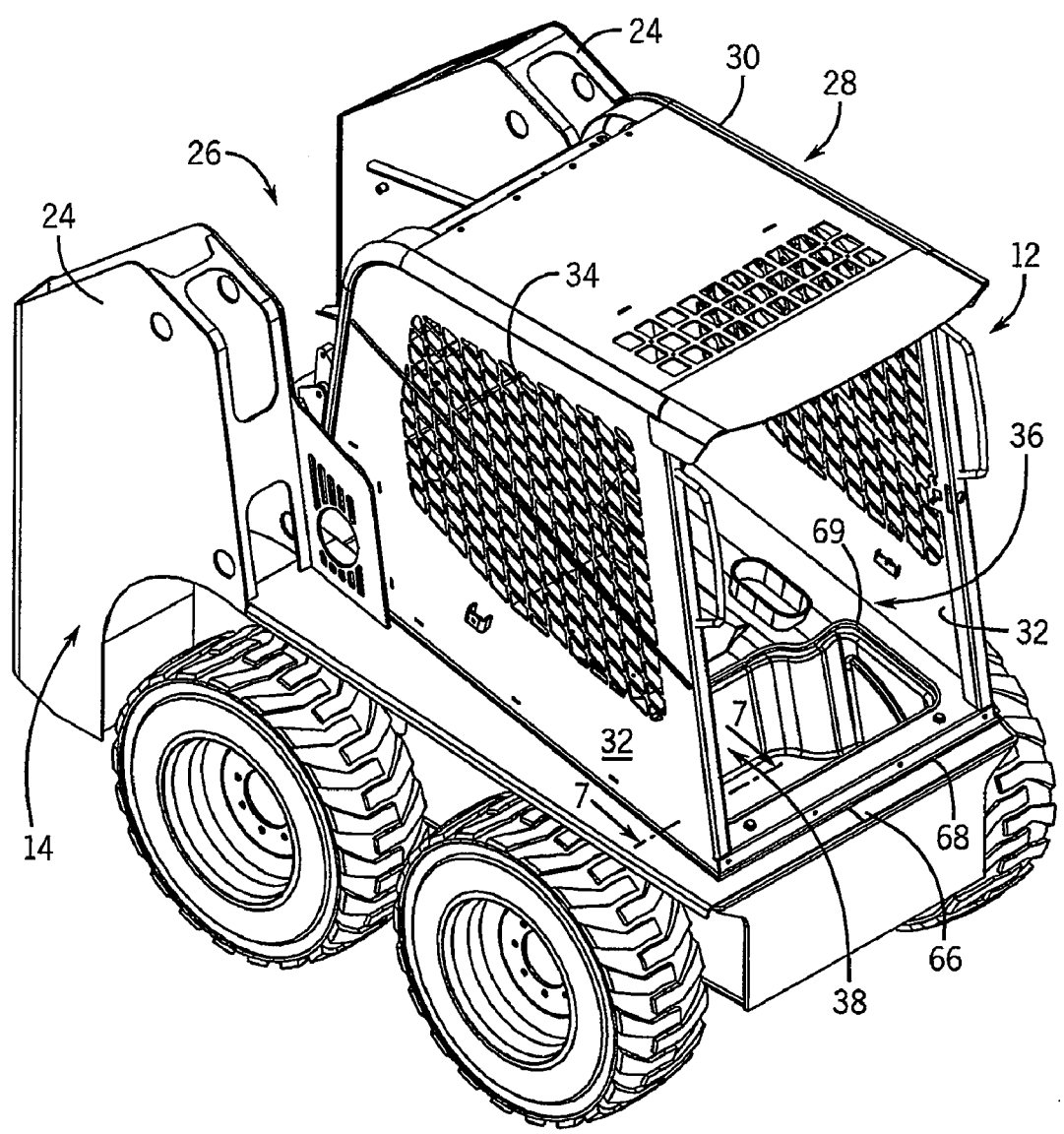
FIG. 2 is an isometric view of the operator cab and foot pod mounted to a chassis of the skid steer loader shown in FIG. 1.

In general, the chassis 14 includes two posts 24 for mounting the lift arms 18 to the chassis 14 as shown in FIG. 2. The mounting posts 24 are positioned near the rear of the chassis 14 and are separated from one another so that a space 26 is defined therebetween. The operator cab 12 has a cab frame 28 that is supported by the chassis 14 generally forward of the space 26. The cab frame 28 includes a top wall 30, a pair of sidewalls 32, and a rear wall 34. In the illustrated embodiment, the operator cab 12 has an exposed forward opening, but is contemplated that a door may be coupled to the cab frame 28 to fully enclose the cab frame 28, such as described in U.S. patent application Ser. No. 12/348,145, entitled "Operator Cab Having Inwardly Folding Access Door", the disclosure of which is incorporated herein. The cab frame 28 generally defines a cockpit 36 for the operator and generally includes a seat (not shown) and various user-controls for controlling operation of the skid steer loader 10. The controls may be mounted to the cab frame 28, carried by the seat, or mounted to other structures contained within the cockpit 36. The operator cab 12 also includes a one-piece foot pod 38 that provides a recess for the operator to place his or her feet when seated or standing in the cockpit 36.

Figure 3:
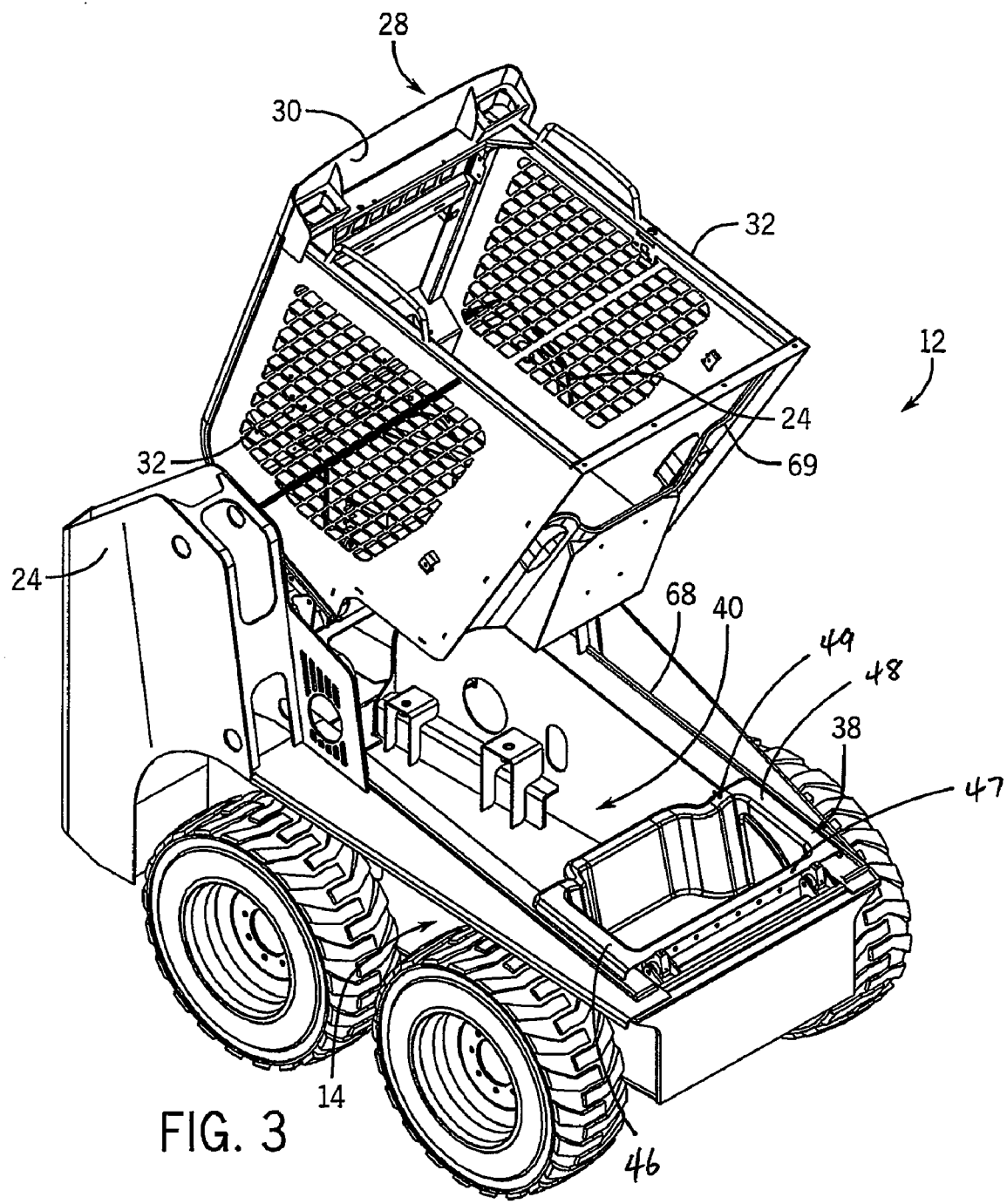
FIG. 3 is an isometric view of the operator cab and foot pod with the operator cab titled upward toward the rear of the chassis.
Figure 4:
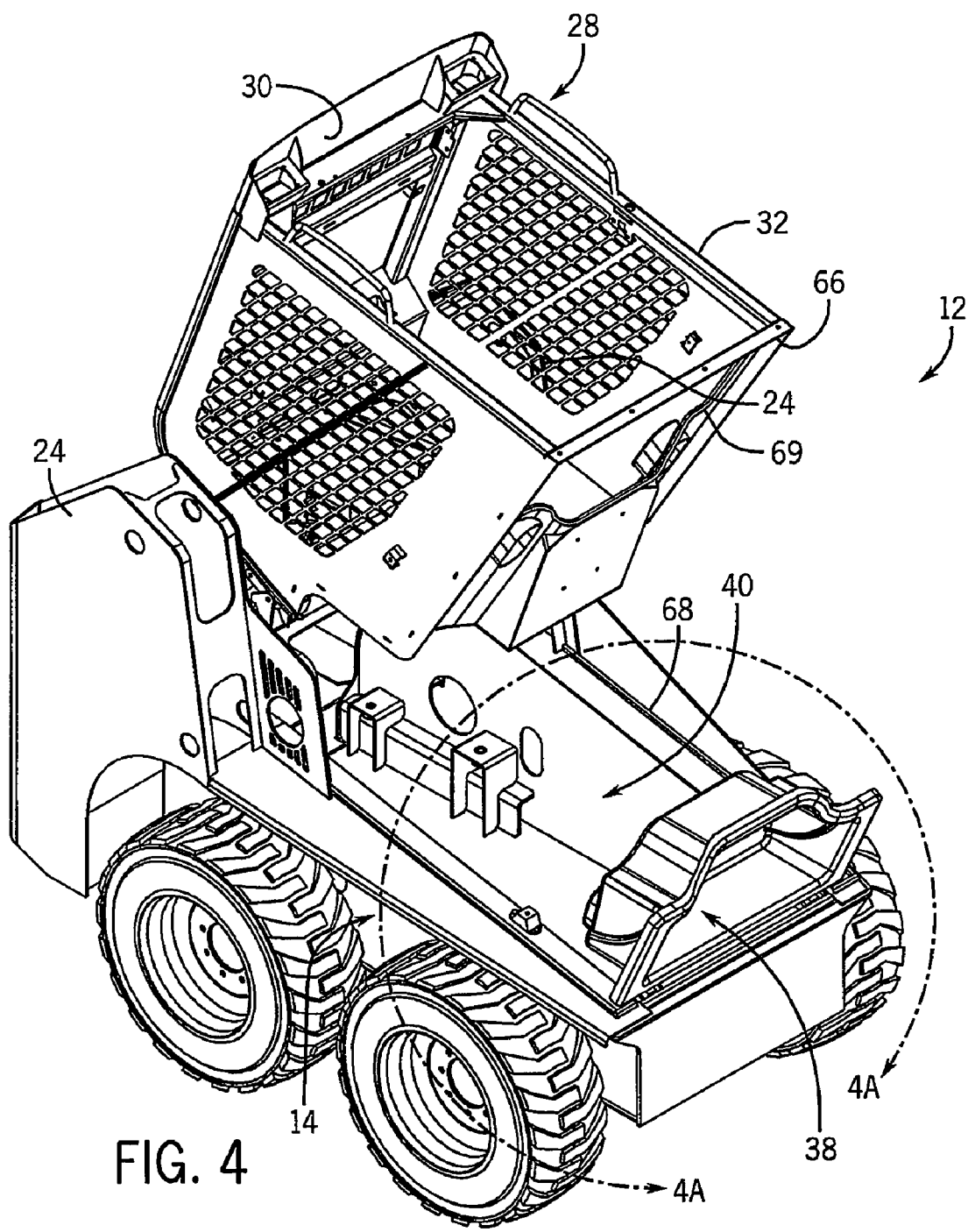
FIG. 4 is an isometric view of the operator cab and foot pod with the foot pod tilted upward toward the front of the chassis.

Referring now to FIG. 3, the cab frame 28 may be pivoted upward and toward the rear of the chassis 14 to expose a cavity 40 formed in the chassis 14. When the cab frame 28 is fully seated on the chassis 14, as shown in FIG. 2, the cab frame 28 together with the chassis 14 provide an enclosure for various components of the skid steer loader 10, such as hydraulic lines, pumps, motors, and the like used in the operation of the skid steer loader 10. When the cab frame 28 is raised, e.g., tilted toward the rear of the chassis 14, the cavity 40 of the chassis is exposed thereby allowing access to those components contained in the cavity 40. As further illustrated in FIG. 3, the cab frame 28 may be tilted rearward independent of the foot pod 38. As shown in FIG. 4, the foot pod 38 may be titled toward the front of the chassis 14 separate from the cab frame 28. This forward tilting of the foot pod 38 further exposes the cavity 40 of the chassis 14.

Figure 4A:
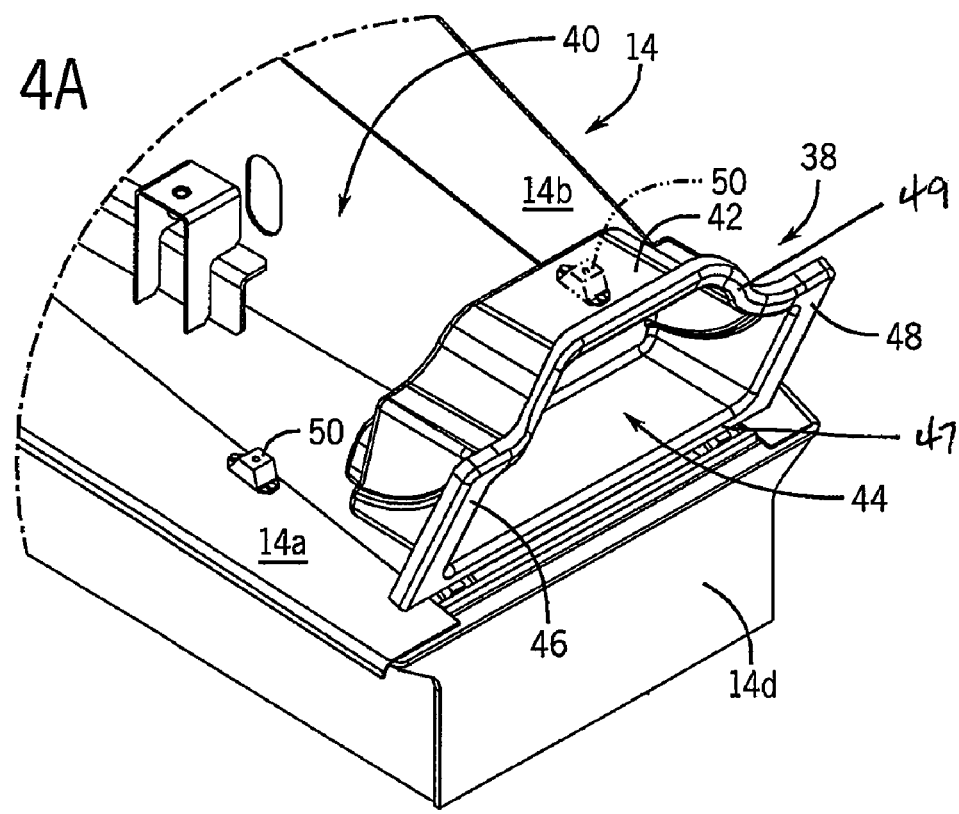
FIG. 4A is an enlarged isometric view of the foot pod in the forward tilted position.

FIG. 4A provides an enlarged view of the foot pod 38 in the forward tilted position. As shown, the foot pod 38 includes a single piece body 42 with a recess 44 formed therein. The recess 44 is defined by a series of side walls and a bottom wall, and preferably has a depth sufficient to receive the feet of an operator when the operator is seated in the operator cab 28. The recess has a relatively wider front area and a narrower rear area, which allows an operator to freely move his or her feet within the recess when the operator is seated. The body 42 includes a pair of flanged edge surfaces 46, 48 that sit atop chassis members 14a, 14b when the foot pod 38 is in the seated (not-tilted) position, such as shown in FIG. 3. To reduce the transference of vibrations from the chassis 14 to the foot pod 38, iso-mounts 50 are mounted to chassis members 14a, 14b and engage the underside of the flanged edge surfaces 46, 48 when the foot pod 38 is in the seated position. The foot pod 38, which may be made of metal, plastic, fiberglass or other material may be fabricated in a number of known techniques including, for example, casting and injection molding.

In addition to the flanged side edge surfaces 46, 48, the foot pod 38 also includes a flanged front surface 47 and a flanged rear surface 49. The floor of the cab 12 includes an opening 51, which has a shape that corresponds to the shape of the upper area of foot pod 38 defined by flanged side edge surfaces 46, 48, flanged front surface 47 and flanged rear surface 49. The opening 51 is configured so that the areas of the cab floor adjacent opening 51 overlie the flanged side edge surfaces 46, 48, the flanged front surface 47 and the flanged rear surface 49 when the cab 12 is lowered and in the operative position. The flanged side edge surfaces 46, 48, the flanged front surface 47 and the flanged rear surface 49 together define a continuous single upwardly facing surface that is well suited for sealing the interior of cab 12, in a manner to be explained.

Figure 4B:
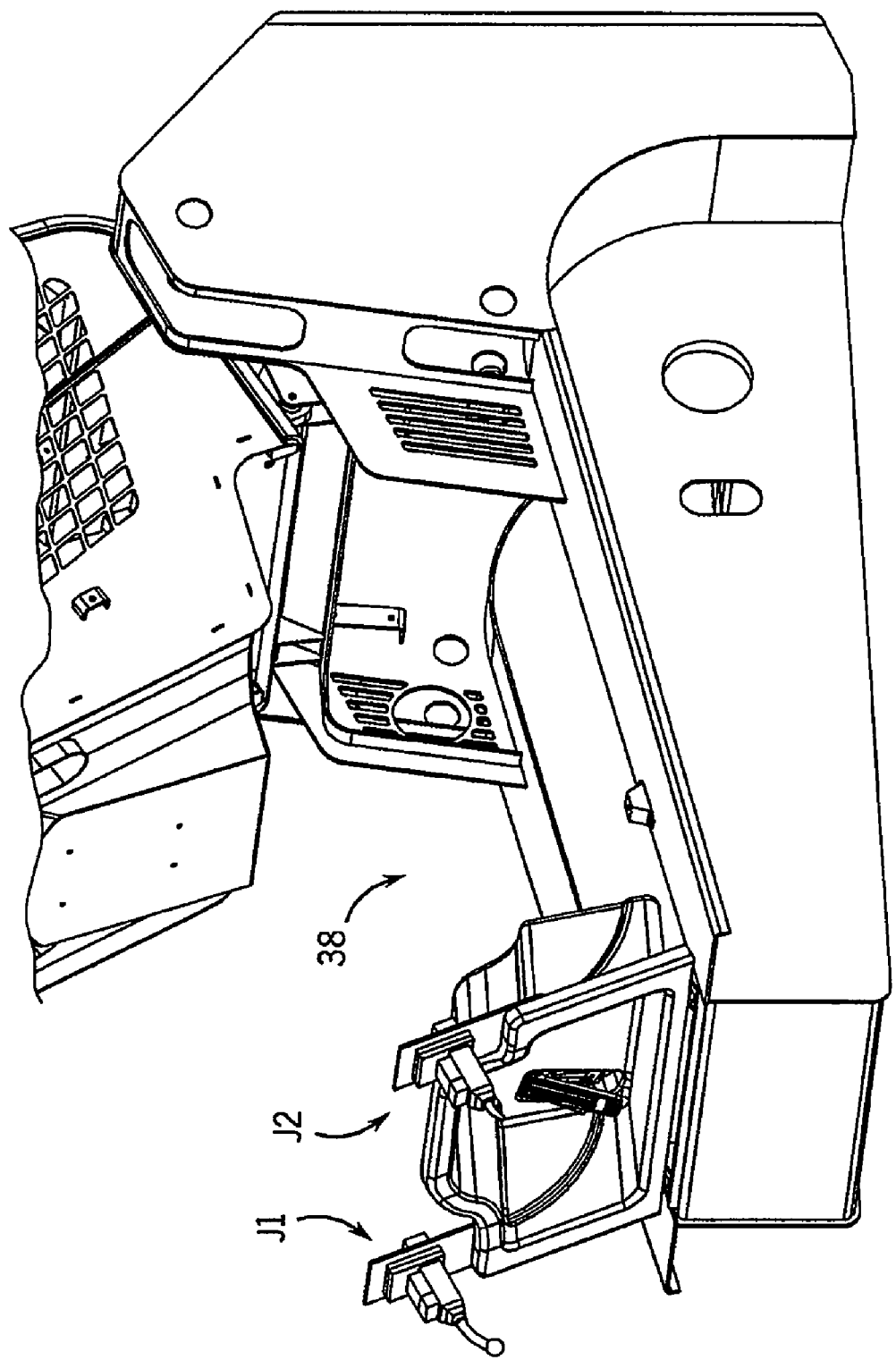
FIG. 4B is an enlarged isometric view of a foot pod with joystick controls mounted thereon according to another embodiment of the present invention.

When the foot pod 38 is tilted forward, such as illustrated in FIGS. 4 and 4A, the recess 44 may be accessed by someone standing on the ground, e.g., supporting surface for the skid steer loader 10. In other words, tilting the foot pod 38 forward provides ground access to the recess 44. This improved access to the recess 44 allows the foot pod 38 to be cleaned of any dirt, dust, trash, and grime much more easily than when the foot pod 38 is in the seated position. To clean the foot pod 38 when it is seated requires someone to climb aboard the skid steer loader and either balance oneself on the chassis 14 or position oneself in the cockpit 36 which does not leave much room to maneuver. The present invention avoids these drawbacks by allowing the foot pod 38 to be tilted forward to a ground-accessible position. Additionally, and referring to FIG. 4B, if any controls, such as joysticks J1 and J2, are mounted to the foot pod 38', the controls may be accessed from the ground which makes it easier to perform any maintenance on the controls. In this regard, it should be understood that the controls, such as joysticks J1 and J2, may be secured to the foot pod as shown in FIG. 4B, or alternatively may be mounted in any other location within the operator cab 12 as in FIG. 4A.

Figure 5:
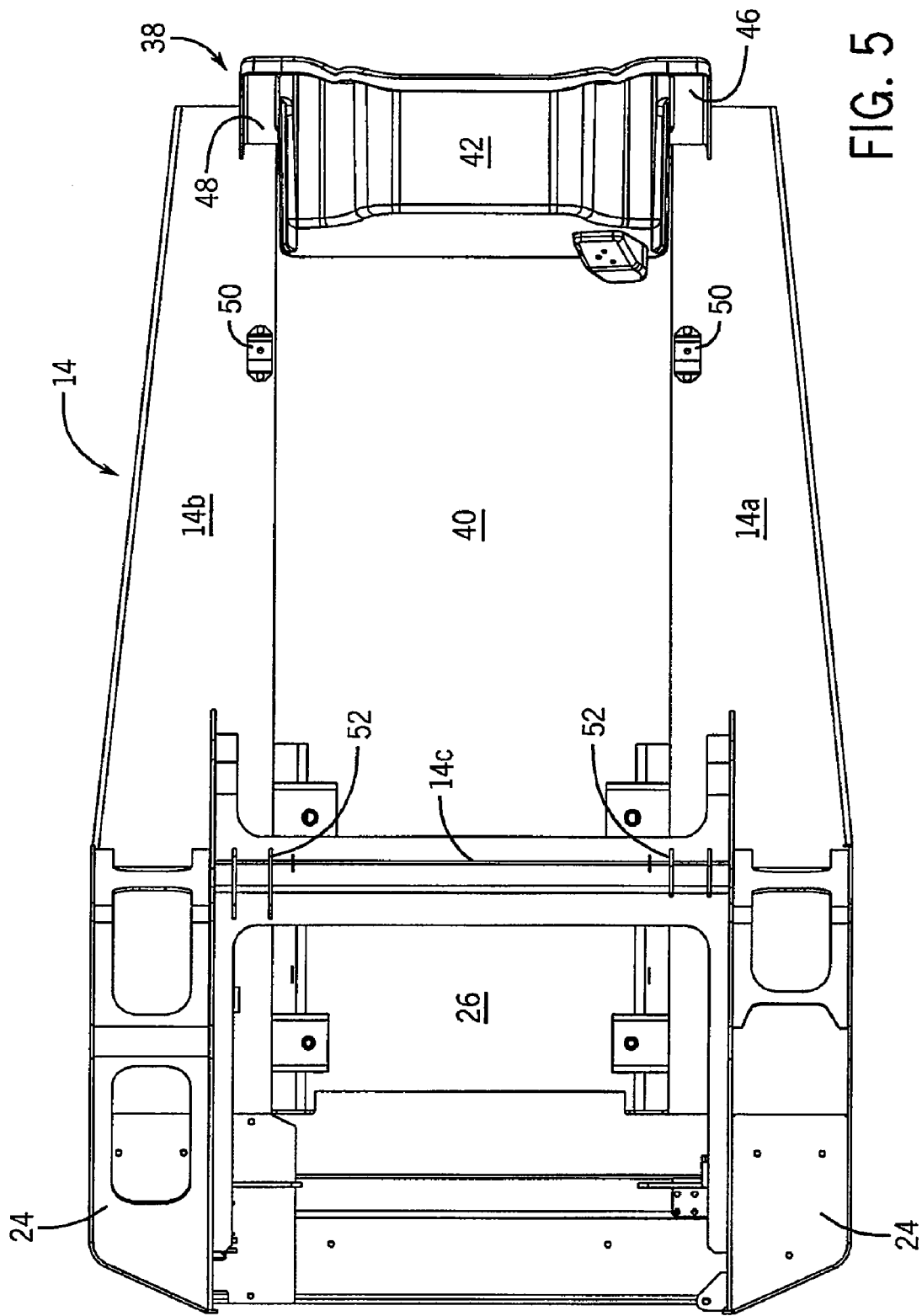
FIG. 5 is a top view of the chassis with the foot pod in the forward tilted position.

As noted above, when the cab frame 28 is in the rearward tilted position and the foot pod 38 is in the forward tilted position, the cavity 40 of the chassis 14 can be easily accessed from above the chassis 14, as illustrated in FIG. 5. The cab frame 28 is shown removed in FIG. 5 but one skilled in the art will appreciate that the cab frame 28 is coupled to frame member 14c extending between frame members 14a, 14b. Conventional pivot mounts 52 may be used couple the cab frame 28 to the chassis 14. The pivot mounts 52 permit the cab frame 28 to be pivoted upward and toward the rear of the chassis 14 and occupy the space 26 between the frame member 14c and the rear of the chassis 14. As described above, after the cab frame 28 is pivoted toward the rear of the chassis 14, the foot pod 38 may be pivoted toward the front of the chassis 14. However, when the foot pod 38 is seated on the chassis 14 and the cab frame 28 is in the working or un-tilted position, the cab frame 28 effectively clamps the foot pod 38 to the chassis 14.

Figure 6:
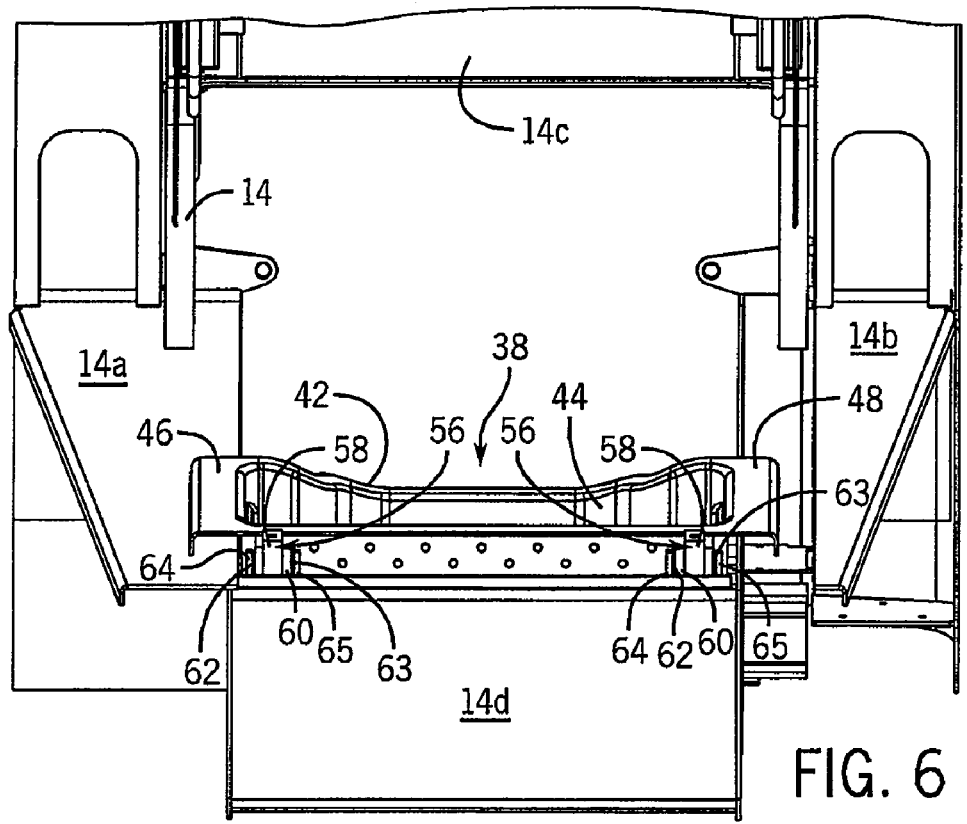
FIG. 6 is front elevation view of the foot pod seated in the chassis.

Referring now to FIG. 6, the chassis 14 includes a front chassis member 14d to which the foot pod 38 is pivotably mounted. More particularly, the foot pod body 42 includes a pair of downwardly extending mounts 56. Each mount 56 includes a mounting arm 58 that carries a boss 60. The boss 60 includes a pair of smaller diameter ends 62, 63 that are received by a pair of brackets 64, 65 that extend upwardly from the front chassis member 14d. The smaller diameter ends 62, 63 are free to rotate relative to the brackets 64, 65 thereby allowing the foot pod 38 to be pivoted relative to the front chassis member 14d. The foot pod 38 is free to pivot until the mounting arms 58 hit the front surface of the forward chassis member 14d. Preferably, the foot pod 38 is free to pivot past the vertical axis of the front chassis member 14d so that the recess 44 faces downward when the foot pod 38 is fully pivoted, as illustrated in FIG. 4A.

Figure 7:
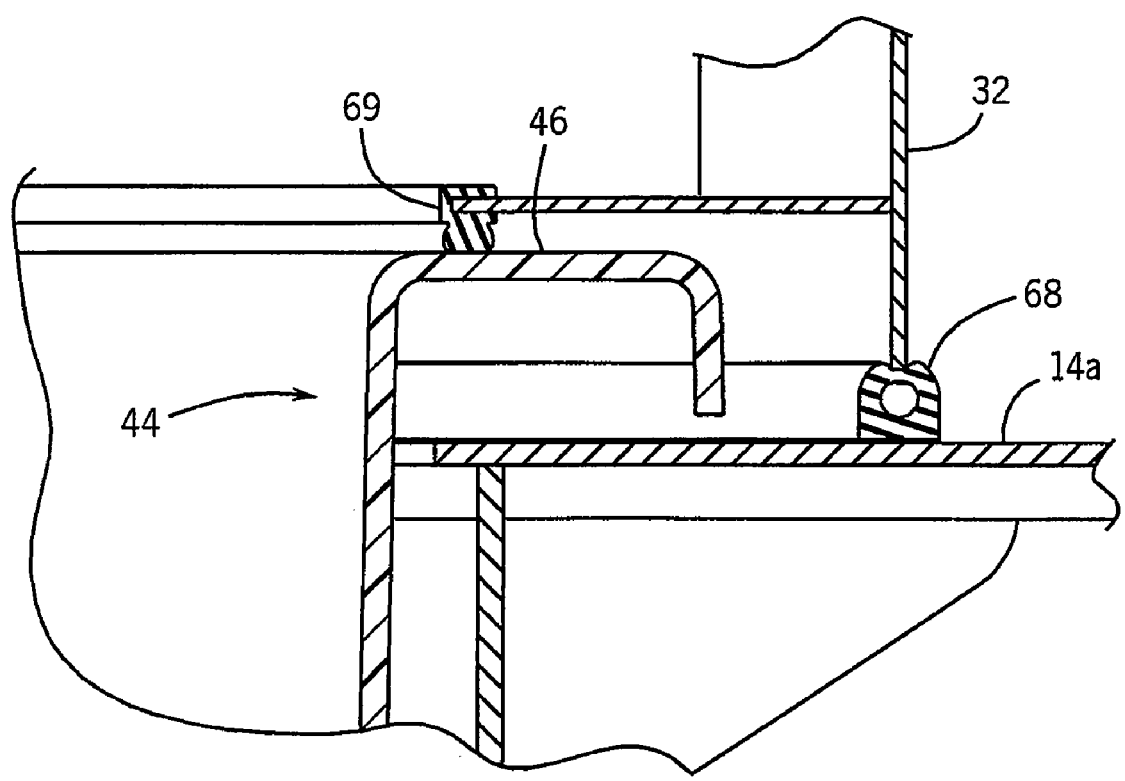
FIG. 7 is a partial section view taken along line 7-7 of FIG. 2.

Referring again to FIG. 2, a front bulb seal 66 and a pair of side bulb seals 68 may be employed to seal the operator cab 12. The front bulb seal 66 is secured to the forward lower edge of the operator cab frame 28 whereas the side bulb seals 68 are secured to the lower side edges of the operator cab frame 28. In addition, a peripheral inner bulb seal 69 is secured to the floor of the cab 12 about the opening 51. FIG. 7 illustrates the manner in which seal 69 engages surface 46 of foot pod 38 when cab 12 is in the lowered, operative position. It can be appreciated that seal 69 engages surfaces 46, 47, 48 and 49 about the entire upper periphery of foot pod 38, which provides a continuous seal to both the interior of cab 12 and the recess 44 of foot pod 38. The bulb seals 66, 68 and 69 reduce the ingress of dirt, dust and grime into to the operator cab 12 through the interface of the operator cab frame 28 and the foot pod 38 to the chassis. Additionally, if the operator cab 12 includes a door mounted to the cab frame 28, the operator cab 12 can be pressurized in a known manner to further reduce the ingress of dirt, dust, and grime into the operator cab 12. Further, maintaining a sealed operator cab 12 provides more efficient climate control of the operator cab 12.

The present invention has been described with respect to an operator cab of a skid steer vehicle, but is understood that the invention may be applicable with the operator cabs of other types of vehicles and particularly other types of construction and agricultural vehicles that are commonly operated in dusty conditions.

We claim:

1. An operator cab assembly for a construction vehicle having a chassis, comprising:
   an operator cab frame pivotably coupled to the chassis in a first location;
   a foot pod pivotably coupled to a the chassis at a second location spaced from the first location; and
   wherein, when the operator cab frame is pivoted in a first direction relative to the chassis, the foot pod may be pivoted in a second direction relative to the chassis opposite the first direction.

2. The operator cab of claim 1 wherein the foot pod is comprised of a molded material.

3. The operator cab of claim 1 further comprising first and second isolation mounts positioned between the foot pod and the chassis.

4. The operator cab of claim 1 further comprising a seal arrangement that seals the interior of the operator cab frame when the operator cab frame and the foot pod are in non-tilted positions.

5. The operator cab of claim 4 wherein the seal arrangement comprises first and the second seals engageable with the cab frame and with the foot pod.

6. The operator cab of claim 1 further comprising at least one control mounted to the foot pod.

7. The operator cab of claim 6 wherein the at least one control is a joystick.

8. A construction vehicle comprising:
   a chassis;
   an operator cab mounted to the chassis and pivotable in a first direction away from the chassis; and
   a foot pod mounted to the chassis and pivotable in a second direction, opposite the first direction, away from the chassis, the foot pod configured to be positioned beneath the operator cab when the operator cab and the foot pod are in operative positions.

9. The vehicle of claim 8 wherein the foot pod is made of a molded material.

10. The vehicle of claim 8 wherein the first direction is a rearward direction and the second direction is a forward direction.

11. The vehicle of claim 8 wherein the chassis includes a cavity and wherein the foot pod is designed to fit within the cavity.

12. The vehicle of claim 8 wherein the foot pod is only pivotable away from the chassis after the operator cab has been pivoted away from the chassis.

13. The vehicle of claim 8 further comprising vibration dampening features mounted to the chassis between the chassis and the foot pod.

14. The vehicle of claim 13 wherein the vibration dampening features include first and second isolation mounts positioned between the foot pod and the chassis.

15. The vehicle of claim 8 further comprising a first seal and a second seal sealing the operator cab when the operator cab is in the non-pivoted position.

16. The vehicle of claim 15 wherein the first and the second seals are bulb seals.

17. The vehicle of claim 8 further comprising at least one control mounted to the foot pod.

18. The vehicle of claim 17 wherein the at least one control is a joystick.

* * * * *